(12) United States Patent
Arya (10) Patent No.: US 7,688,548 B2
(45) Date of Patent: Mar. 30, 2010

(54) UTILIZING AN INTERLOCKING DISSIMILAR METAL COMPONENT IN THE FORMATION OF A HARD DISK DRIVE

(75) Inventor: Satya P. Arya, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 838 days.

(21) Appl. No.: 11/359,006

(22) Filed: Feb. 21, 2006

(65) Prior Publication Data
US 2007/0194084 A1  Aug. 23, 2007

(51) Int. Cl.
*G11B 5/55* (2006.01)

(52) U.S. Cl. .................. 360/244.2; 360/244.3

(58) Field of Classification Search ... 360/97.01–99.12, 360/240–246.8
See application file for complete search history.

(56) References Cited

U.S. PATENT DOCUMENTS

| 3,175,893 | A | * | 3/1965 | Meretsky | ............... | 428/579 |
|---|---|---|---|---|---|---|
| 3,664,816 | A | | 5/1972 | Finnegan | | |
| 4,823,578 | A | | 4/1989 | Coe et al. | | |
| 4,991,045 | A | | 2/1991 | Oberg | | |
| 5,121,537 | A | | 6/1992 | Matsui et al. | | |
| 5,345,667 | A | | 9/1994 | Coppier | | |
| 5,633,093 | A | | 5/1997 | Rhoda et al. | | |
| 5,877,919 | A | | 3/1999 | Foisy et al. | | |
| 5,910,377 | A | * | 6/1999 | Tsukamoto et al. | ......... | 428/609 |
| 6,061,892 | A | | 5/2000 | Kassi | | |
| 6,404,593 | B1 | | 6/2002 | Iwamoto | | |
| 6,870,708 | B1 | * | 3/2005 | Fossum et al. | ........... | 360/244.5 |
| 7,097,914 | B2 | * | 8/2006 | Tanaka et al. | ............... | 428/609 |
| 2001/0008475 | A1 | | 7/2001 | Takagi et al. | | |
| 2002/0064000 | A1 | | 5/2002 | Liu et al. | | |
| 2002/0181155 | A1 | | 12/2002 | Takagi et al. | | |
| 2004/0120076 | A1 | | 6/2004 | Takagi et al. | | |

FOREIGN PATENT DOCUMENTS

| GB | 358760 | 2/1982 |
|---|---|---|
| JP | 57025205 | 2/1982 |
| JP | 60238093 | 11/1985 |

OTHER PUBLICATIONS

"Clad Metal Hard File Arm" IBM TDB Jan. 1990 p. 174.

* cited by examiner

*Primary Examiner*—A. J. Heinz (57) ABSTRACT

A method and system for utilizing an interlocking dissimilar metal component in the formation of a hard disk drive is disclosed. The method provides a hard disk drive component having at least one interlocking dissimilar metal component, the at least one interlocking dissimilar metal component having at least two dissimilar metals on a single side. The interlocking dissimilar metal component is utilized to provide a similar materials weld location for coupling two dissimilar metals to a single side surface of the at least one interlocking dissimilar metal hard disk drive component.

13 Claims, 8 Drawing Sheets

UTILIZING AN INTERLOCKING DISSIMILAR METAL COMPONENT IN THE FORMATION OF A HARD DISK DRIVE

TECHNICAL FIELD

The present invention relates to the field of hard disk drive development, and more particularly to a method and system for utilizing an interlocking dissimilar metal component in the formation of a hard disk drive.

BACKGROUND ART

Hard disk drives are used in almost all computer system operations. In fact, most computing systems are not operational without some type of hard disk drive to store the most basic computing information such as the boot operation, the operating system, the applications, and the like. In general, the hard disk drive is a device which may or may not be removable, but without which the computing system will generally not operate.

The basic hard disk drive model was established approximately 50 years ago and resembles a phonograph. That is, the hard drive model includes a hard storage disk that spins at a standard rotational speed. An actuator moves a magnetic read/write head over the disk. The actuator arm carries a head gimbal assembly (HGA) that includes a slider and a suspension with a nose portion for directly contacting a ramp used during the load and unload cycles for a load/unload drive. The slider carries a head assembly that includes a magnetic read/write transducer or head for reading/writing information to or from any desired location on the disk.

In operation, the hard disk is rotated at a set speed via a spindle motor assembly having a central drive hub. Additionally, there are tracks evenly spaced at known intervals across the disk. When a request for a read of a specific portion or track is received, the hard disk aligns the head, via the arm, over the specific track location and the head reads the information from the disk. In the same manner, when a request for a write of a specific portion or track is received, the hard disk aligns the head, via the arm, over the specific track location and the head writes the information to the disk.

Over the years, the disk and the head have undergone great reductions in their size. Much of the refinement has been driven by consumer demand for smaller and more portable hard drives such as those used in personal digital assistants (PDAs), MP3 players, and the like. For example, the original hard disk drive had a disk diameter of 24 inches. Modern hard disk drives are much smaller and include disk diameters 3.5 to 1 inches (and even smaller 0.8 inch). Advances in magnetic recording are also primary reasons for the reduction in size.

However, as the size of hard disk drives are reduced, the methods used for assembling the components within the hard disk drive and attaching components of the hard disk drive are quickly reaching there design limitations. For example, the suspension portion of the head gimbal assembly is stainless steel while the arm is aluminum. Presently, these dissimilar metals, e.g., the arm and suspension, are swaged together due to the inability of welding dissimilar metals. However, because of the overall reduction in component size, the swaging is no longer as reliable as it was when the components were bigger and more surface area was available. In some cases, the swaging of the smaller components results in distortions to the mount plate resulting in deleterious gram loading and static attitude changes at the head. Moreover, the dynamic flutter is also increased.

Solutions to the swaging issue brought on by component size reduction include adhesive bonding or modification of component make-up such as forming the arm from stainless steel. However, adhesive bonding is not re-workable and if it is incorrectly applied the parts are no longer usable and must be scrapped. This is an expensive solution. Additionally, the formation of the components from different materials, e.g., an aluminum arm, significantly degrades dynamic performance of the components.

SUMMARY

A method and system for utilizing an interlocking dissimilar metal component in the formation of a hard disk drive is disclosed. The method provides a hard disk drive component having at least one interlocking dissimilar metal component, the at least one interlocking dissimilar metal component having at least two dissimilar metals on a single side. The interlocking dissimilar metal component is utilized to provide a similar materials weld location for coupling two dissimilar metals to a single side surface of the at least one interlocking dissimilar metal hard disk drive component.

BEST MODES FOR CARRYING OUT THE INVENTION

Reference will now be made in detail to the alternative embodiment(s) of the present invention. While the invention will be described in conjunction with the alternative embodiment(s), it will be understood that they are not intended to limit the invention to these embodiments. On the contrary, the invention is intended to cover alternatives, modifications and equivalents, which may be included within the spirit and scope of the invention as defined by the appended claims.

Furthermore, in the following detailed description of the present invention, numerous specific details are set forth in order to provide a thorough understanding of the present invention. However, it will be recognized by one of ordinary skill in the art that the present invention may be practiced without these specific details. In other instances, well known methods, procedures, components, and circuits have not been described in detail as not to unnecessarily obscure aspects of the present invention.

The discussion will begin with an overview of a hard disk drive and components connected therewith. The discussion will then focus on embodiments of a method and system for utilizing an interlocking dissimilar metal component in the formation of a portion of the hard disk drive components in particular.

In general, embodiments of the present invention provide a method and apparatus for forming one or more of the components of a hard disk drive using an interlocking dissimilar metal component. In one embodiment, the interlocking dissimilar metal component is formed from aluminum and stainless steel layers where the stainless steel layer has holes formed therein and the aluminum layer is compressed to fill in the holes in the stainless steel layer providing a surface having two dissimilar metals accessible from one side for similar material welding. The components that are formed from the interlocking dissimilar metal components can include a mount plate portion of a head gimbal assembly, an arm portion of a head gimbal assembly, and a load beam portion of the head gimbal assembly. Additionally, the dissimilar metal component could be used to form a cover portion for the hard disk drive.

Figure 1:
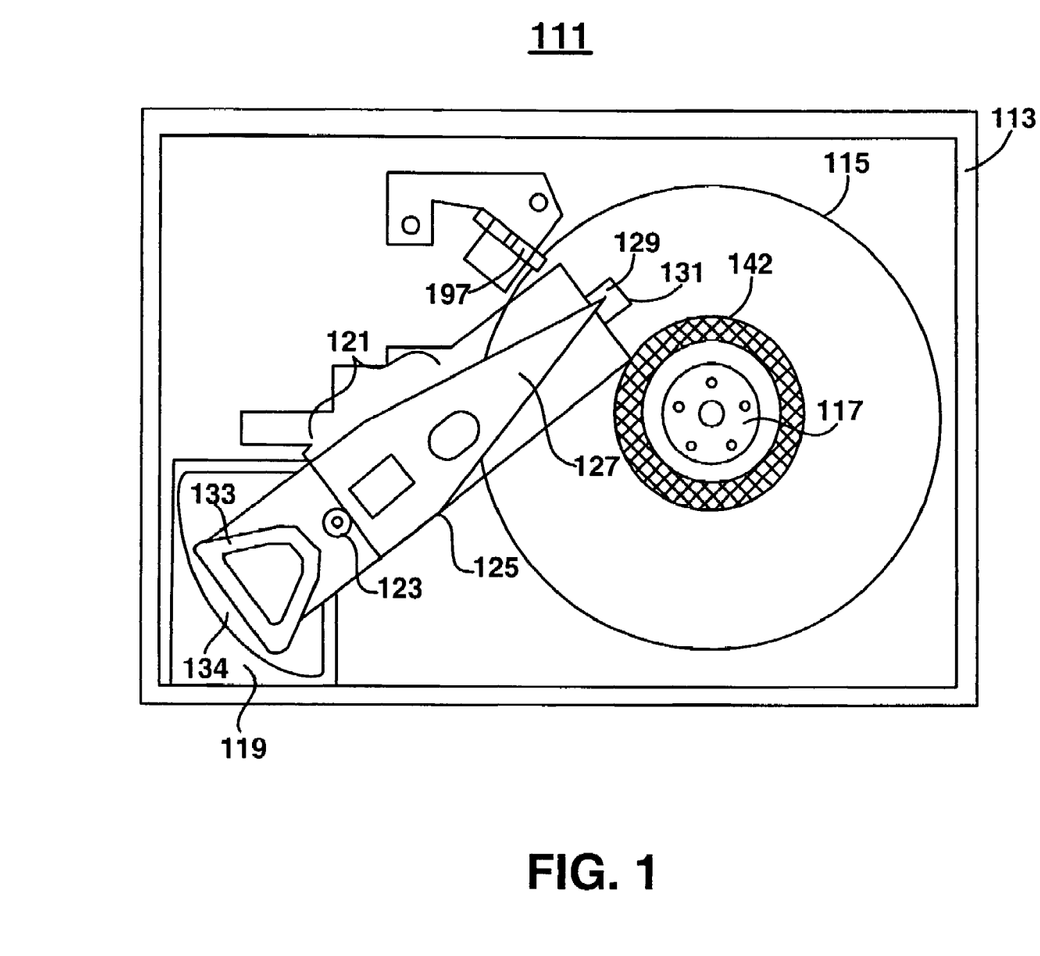
FIG. 1 is a schematic top plan view of a hard disk drive, in accordance with one embodiment of the present invention.

With reference now to FIG. 1, a schematic drawing of one embodiment of an information storage system comprising a magnetic hard disk file or drive 111 for a computer system is shown. Embodiments of the invention are well suited for utilization on a plurality of hard disk drives. The utilization of the driver of FIG. 1 is merely one of a plurality of disk drives that may be utilized in conjunction with the present invention. For example, in one embodiment the hard disk drive 111 would use load/unload (L/UL) techniques with a ramp 197 and a nose limiter. In another embodiment, the drive 111 is a non L/UL drive, for example, a contact start-stop (CSS) drive having a textured landing zone 142 away from the data region of disk 115.

In the exemplary FIG. 1, Drive 111 has an outer housing or base 113 containing a disk pack having at least one media or magnetic disk 115. A spindle motor assembly having a central drive hub 117 rotates the disk or disks 115. An actuator comb 121 comprises a plurality of parallel actuator arms 125 (one shown) in the form of a comb that is movably or pivotally mounted to base 113 about a pivot assembly 123. A controller 119 is also mounted to base 113 for selectively moving the comb of arms 125 relative to disk 115.

In the embodiment shown, each arm 125 has extending from it at least one cantilevered Electrical Lead Suspension (ELS) 127. It should be understood that ELS 127 may be, in one embodiment, an integrated lead suspension (ILS) that is formed by a subtractive process. In another embodiment, ELS 127 may be formed by an additive process, such as a Circuit Integrated Suspension (CIS). In yet another embodiment, ELS 127 may be a Flex-On Suspension (FOS) attached to base metal or it may be a Flex Gimbal Suspension Assembly (FGSA) that is attached to a base metal layer. The ELS may be any form of lead suspension that can be used in a Data Access Storage Device, such as a HDD. A magnetic read/write transducer 131 or head is mounted on a slider 129 and secured to a flexible structure called "flexure" that is part of ELS 127.

The read/write heads magnetically read data from and/or magnetically write data to disk 115. The level of integration called the head gimbal assembly is the head and the slider 129, which are mounted on suspension 127. The slider 129 is usually bonded to the end of ELS 127.

ELS 127 has a spring-like quality, which biases or presses the air-bearing surface of the slider 129 against the disk 115 to cause the slider 129 to fly at a precise distance from the disk as the disk rotates and air bearing develops pressure. ELS 127 has a hinge area that provides for the spring-like quality, and a flexing interconnect (or flexing interconnect) that supports read and write traces through the hinge area. A voice coil 133, free to move within a conventional voice coil motor magnet assembly 134 (top pole not shown), is also mounted to arms 125 opposite the head gimbal assemblies. Movement of the actuator comb 121 by controller 119 causes the head gimbal assemblies to move along radial arcs across tracks on the disk 115 until the heads settle on their set target tracks. The head gimbal assemblies operate in a conventional manner and always move in unison with one another, unless drive 111 uses multiple independent actuators (not shown) wherein the arms can move independently of one another.

In general, the load/unload drive refers to the operation of the ELS 127 with respect to the operation of the disk drive. That is, when the disk 115 is rotating, the ELS 127 is unloaded from the disk. For example, when the disk drive is not in operation, the ELS 127 is not located above the disk 115 but is instead located in a holding location on L/UL ramp 197 away from the disk 115 (e.g., unloaded). Then, when the disk drive is operational, the disk(s) are spun up to speed, and the ELS 127 is moved into an operational location above the disk(s) 115 (e.g., loaded). In so doing, the deleterious encounters between the slider and the disk 115 during non-operation of the HDD 111 are greatly reduced. Moreover, due to the movement of the ELS 127 to a secure off-disk location during non-operation, the mechanical ship shock robustness of the HDD is greatly increased.

Figure 2A:
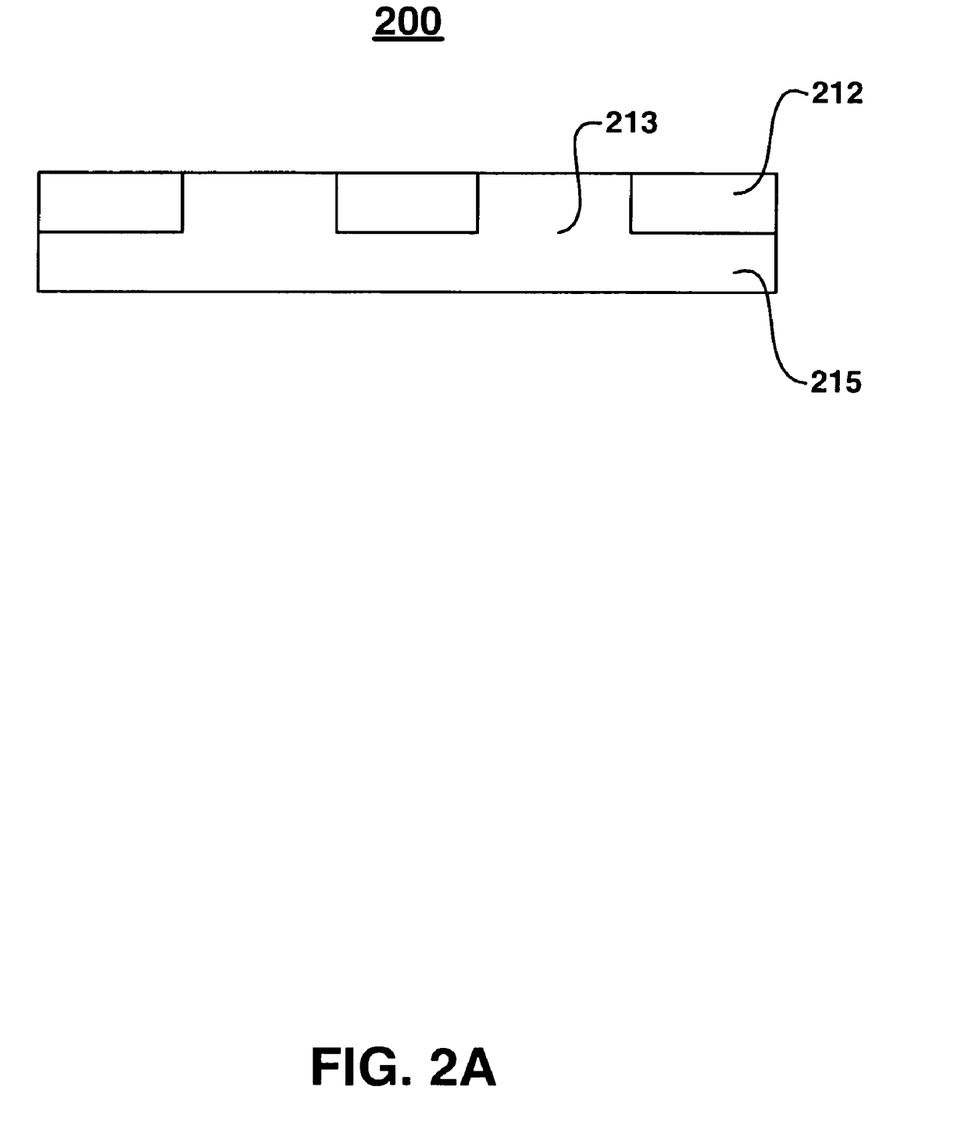
FIG. 2A is a side view of an interlocking dissimilar metal component having at least two dissimilar metals on a single side, in accordance with one embodiment of the present invention.

With reference now to FIG. 2A a side view of an interlocking dissimilar metal component having at least two dissimilar metals on a single side is shown in accordance with one embodiment of the present invention. In general, the interlocking dissimilar metal component 200 includes a layer of stainless steel 212 having holes 213 therein. In one embodiment, the holes are punched, etched, or the like in the stainless steel layer 212. The interlocking dissimilar metal component 200 also includes an aluminum layer 215. In another embodiment, the layer 215 is not aluminum but is another metal layer that is formed of a metal that is softer and dissimilar than stainless steel. In one embodiment, to form the interlocking dissimilar metal component 200, the layers of stainless steel 212 and aluminum 215 are rolled or compressed together. The pressure from the compression will cause the aluminum layer 125 to fill the holes in the stainless steel layer 212. In so doing, the resulting interlocking dissimilar metal component 200 will have one surface formed with two dissimilar metals located thereon. This formation of two dissimilar metals on the same surface allows the dissimilar metal component surface to be welded (e.g., laser welding and the like) to two different metal types.

Figure 2B:
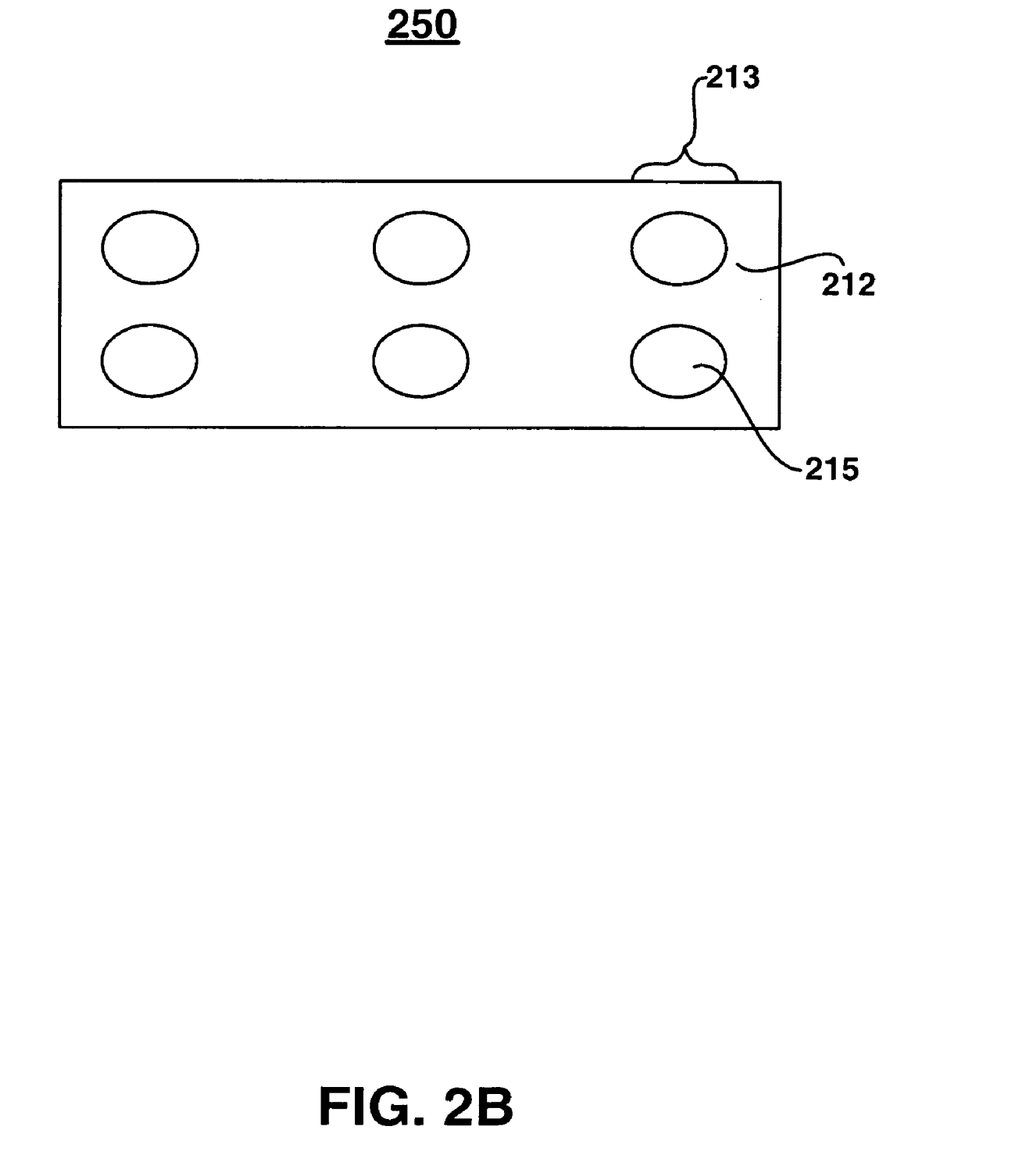
FIG. 2B is a top view of an interlocking dissimilar metal component having at least two dissimilar metals on a single side, in accordance with one embodiment of the present invention.

Referring now to FIG. 2B, a top view 250 of the interlocking dissimilar metal component such as formed in FIG. 2A is shown in accordance with one embodiment of the present invention. Although the holes 213 are shown in a column and row formation, the holes in the stainless steel layer 221 may be in a plurality of different configurations based on component design, manufacturing preference, ease, convenience, tolerances, requirements, and the like. The use of distinct columns and rows is shown merely for purposes of brevity and clarity.

Figure 2C:
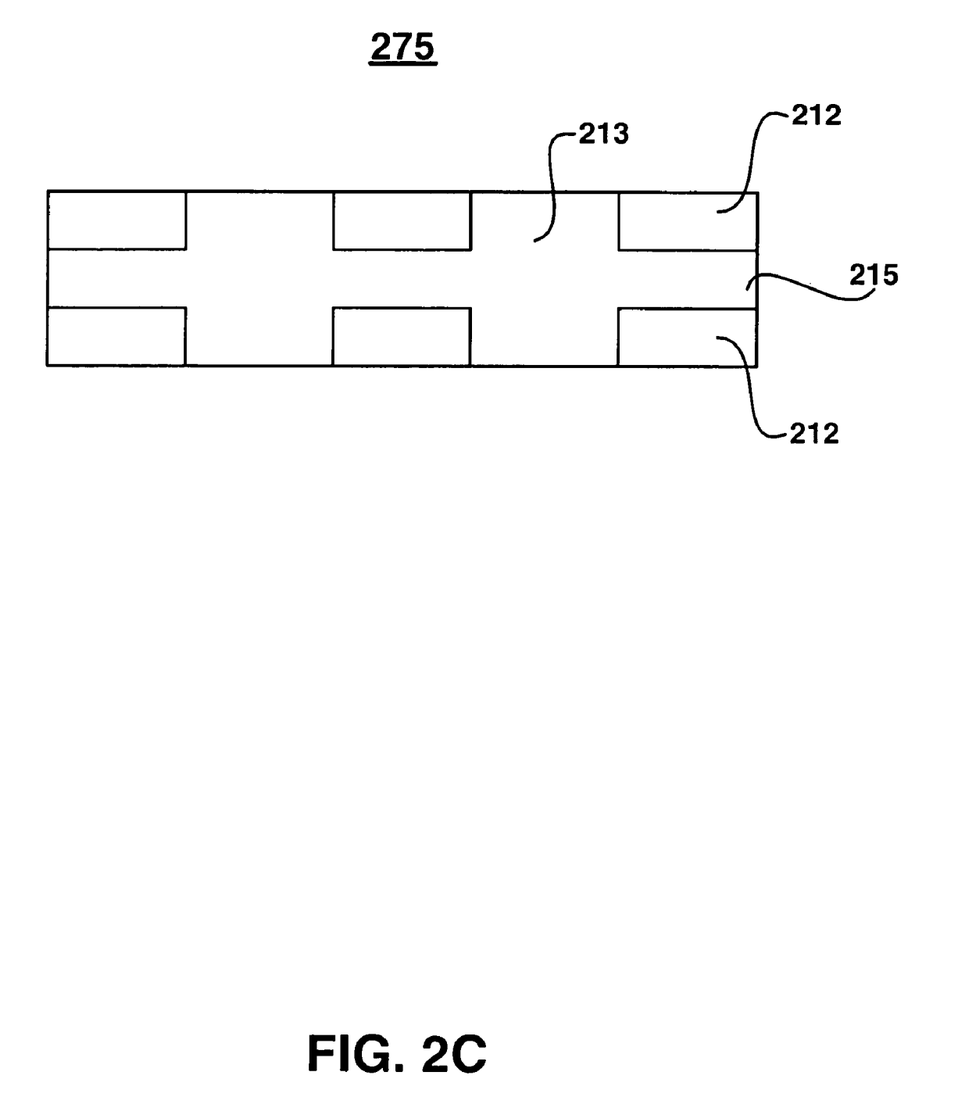
FIG. 2C is a side view of an interlocking dissimilar metal component having at least two dissimilar metals on both sides, in accordance with one embodiment of the present invention.

With reference now to FIG. 2C, a side view of an interlocking dissimilar metal component 275 having at least two dissimilar metals on both sides is shown in accordance with one embodiment of the present invention. In general, the interlocking dissimilar metal component 275 is similar to the interlocking dissimilar metal component 200. However, instead of a single stainless steel 212 layer, the aluminum layer 215 (or other soft metal layer) is sandwiched between two stainless steel 212 layers (or harder metal layers). Therefore, when the materials are compressed, e.g., rolled or the like, the resulting interlocking dissimilar metal component 275 will have the formation of two dissimilar metals on both the top and bottom surface thereby allowing the dissimilar metal component surface to be welded (e.g., laser welding and the like) to two different metal types on both the top and the bottom.

Reasons for utilizing an interlocking dissimilar metal component 275 having dissimilar metal surfaces on both the top and the bottom include reducing distortions due to heat. That is, when the dissimilar metals expand due to change in temperature, because the same metal is on the top and bottom layer, the expansion will be uniform due to opposite forces. Additionally, the interlocking dissimilar metal component 275 can be used to replace two components with a single component. For example, as described herein, by forming the actuator arm with the dissimilar metal, the mount plate as required in the prior art can be removed from the actuator assembly (described in FIG. 3).

Figure 3:
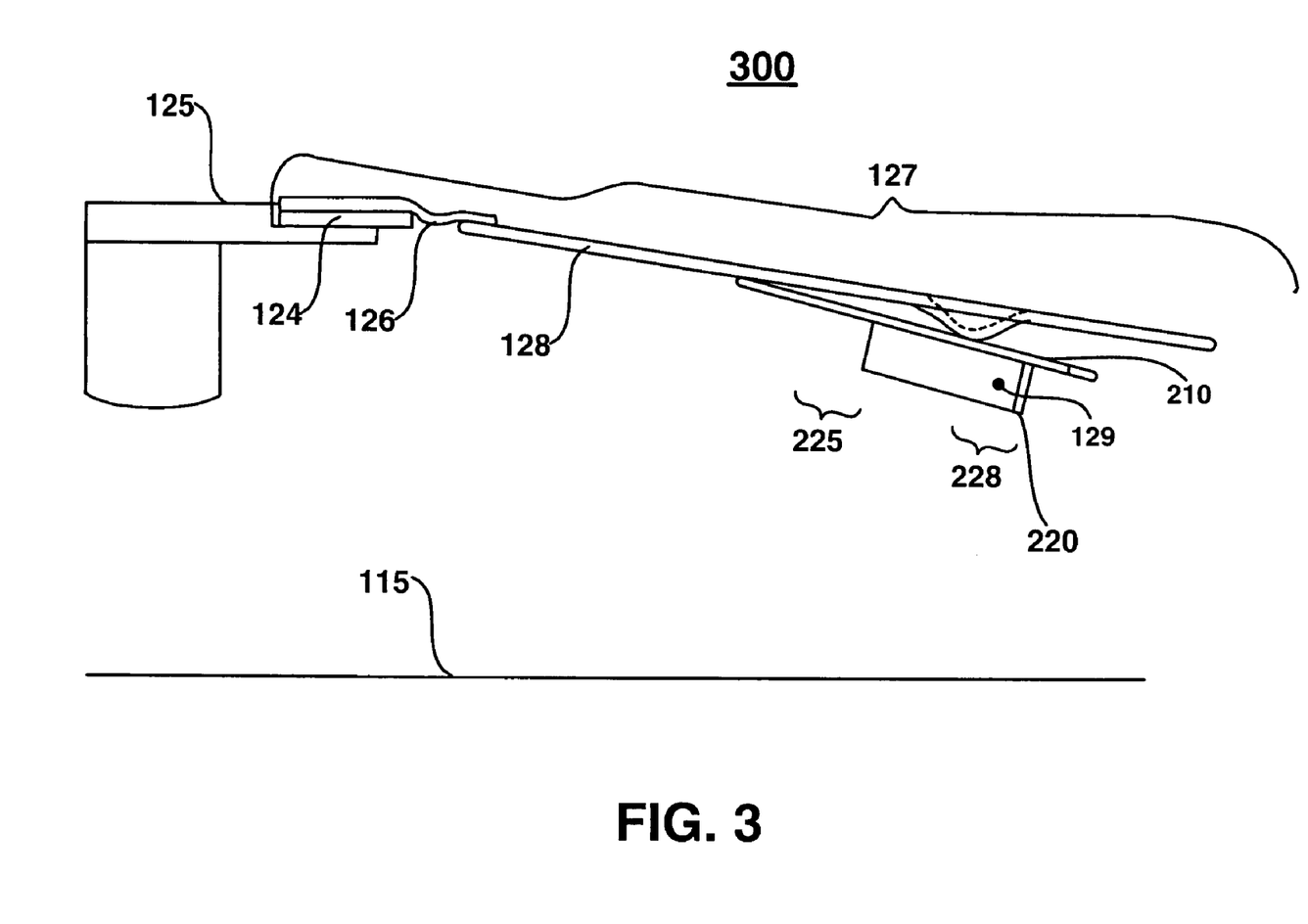
FIG. 3 is a side view of a typical actuator having one or more components formed form the interlocking dissimilar metal component in accordance with one embodiment of the present invention.

Referring now to FIG. 3, a side view of a typical actuator 300 is shown. The actuator arm 125 has extending from it at least one cantilevered ELS 127. An ELS 127 consists of a mount (or base) plate 124, hinge 126, and a load beam 128 (upon which reside electrical leads and a flexure shown in FIG. 4). Based on ELS design some of these components can be combined together into one integral piece. For example hinge 126 and load beam 128 can be one piece and the electrical leads and flexure on the load beam 128 can be one piece. A magnetic read/write transducer or head 220 is mounted on a slider 129 and is attached to flexible gimbal 210 of the ELS 127. The level of integration called the head gimbal assembly (HGA) is the slider 129 carrying head 220, which is mounted on ELS 127. The slider 129 has a leading edge (LE) portion 225 and a trailing edge portion (TE) 228. The LE and TE are defined by the airflow direction. That is, the air flows from the LE to the TE. Usually, the head 220 locates at the TE portion 228 of the slider 129. A portion of an exemplary disk 115 is also shown in FIG. 3 for purposes of clarity.

By utilizing the, the interlocking dissimilar metal component such as 200 or 275 to replace one or a plurality of the components of FIG. 3, it is now possible to perform a welding operation between two dissimilar metals on the same side of the interlocking dissimilar metal component (e.g., 200 or 275). Moreover, due to the strength of the interconnect between the two dissimilar metals (e.g., due to the friction forces between the softer metal and the harder metal at each hole), dissimilar metal welding (e.g., laser welding and the like) can further be performed on both sides of the interlocking dissimilar metal component (e.g., 200 or 275) without concern for static or dynamic stability related issues.

For example, in one embodiment, the suspension hinge 126 or load beam 128 is welded to the stainless steel portion 212 of the interlocking dissimilar metal component (e.g., 200 or 275) while the aluminum arm 125 is welded to the aluminum 215 in filled holes 213 on the same side. In another embodiment, the mount plate 124 is made out of the interlocking dissimilar metal component (e.g., 200 or 275) permitting the welding of suspension to arm. In yet another embodiment, the hard disk drive's stainless steel cover is formed from the interlocking dissimilar metal component (e.g., 200 or 275) and is then welded to the aluminum base casting. This is especially valuable in helium filled sealed files.

Figure 4:
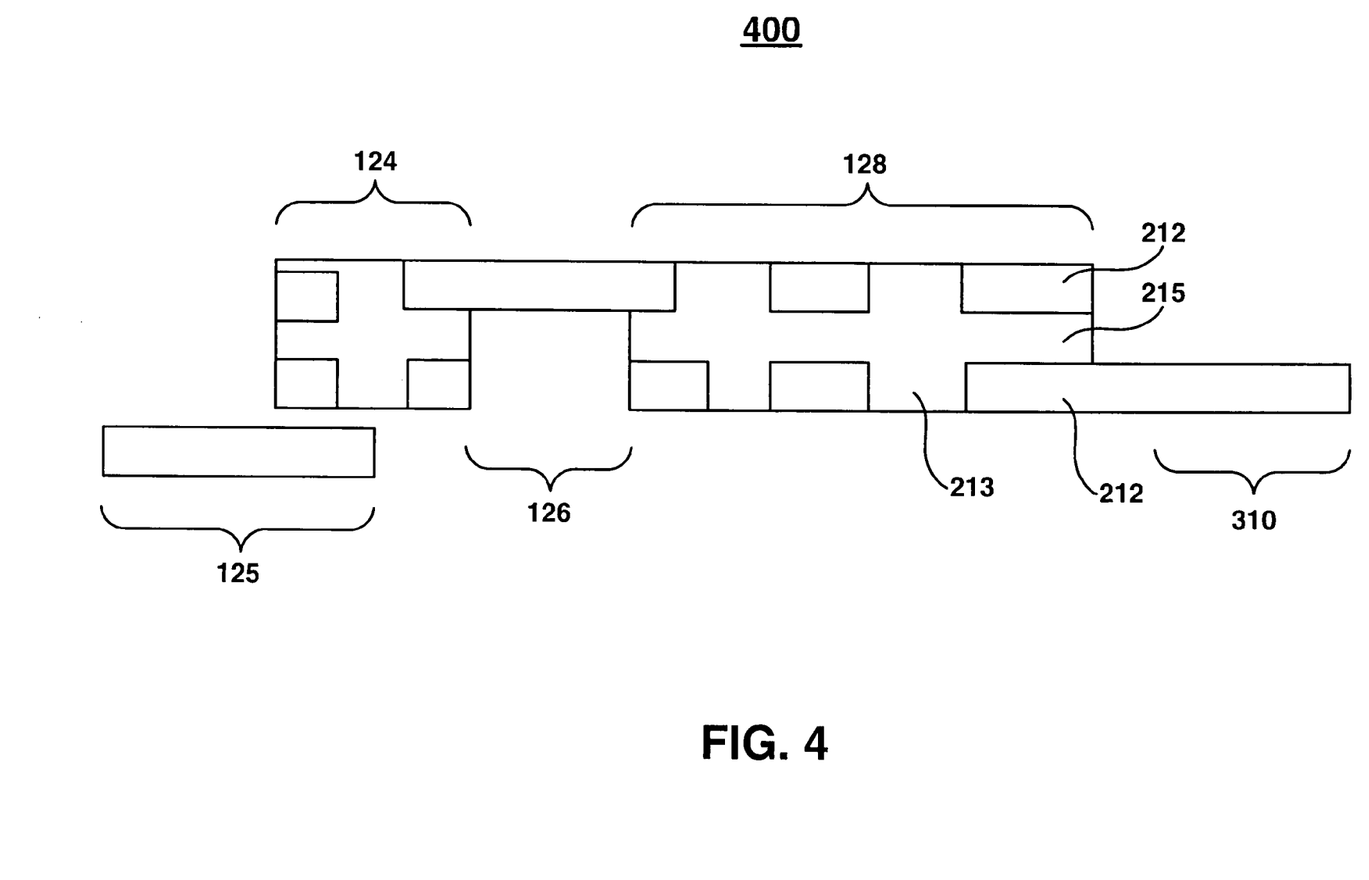
FIG. 4 is a side view of an exemplary ELS formed from a single piece of the interlocking dissimilar metal component in accordance with one embodiment of the present invention.

With reference now to FIG. 4, an exemplary ELS 400 formed from a single piece of the interlocking dissimilar metal component 275 is shown in accordance with one embodiment of the present invention. In one embodiment, portions of the interlocking dissimilar metal component 275 are etched to form the ELS. For example, the mount plate 124, hinge 126, load beam 128 and load/unload nose 310 are formed out of a single piece of the interlocking dissimilar metal component 275. In one embodiment, the mount plate 124 is a complete piece of the interlocking dissimilar metal component 275. However, the hinge 126 is formed by removing the second layer of stainless steel 212 and the layer of aluminum 215. The load beam 128 is then left as a complete piece of the interlocking dissimilar metal component 275. The first layer of stainless steel 212 and the aluminum layer 215 are then etched leaving only the second layer of stainless steel 212 to form the load/unload nose 310. In so doing, a complete ELS 400 is formed from a single piece of the interlocking dissimilar metal component 275. Thus, significant manufacturing time and costs are reduced.

Figure 5:
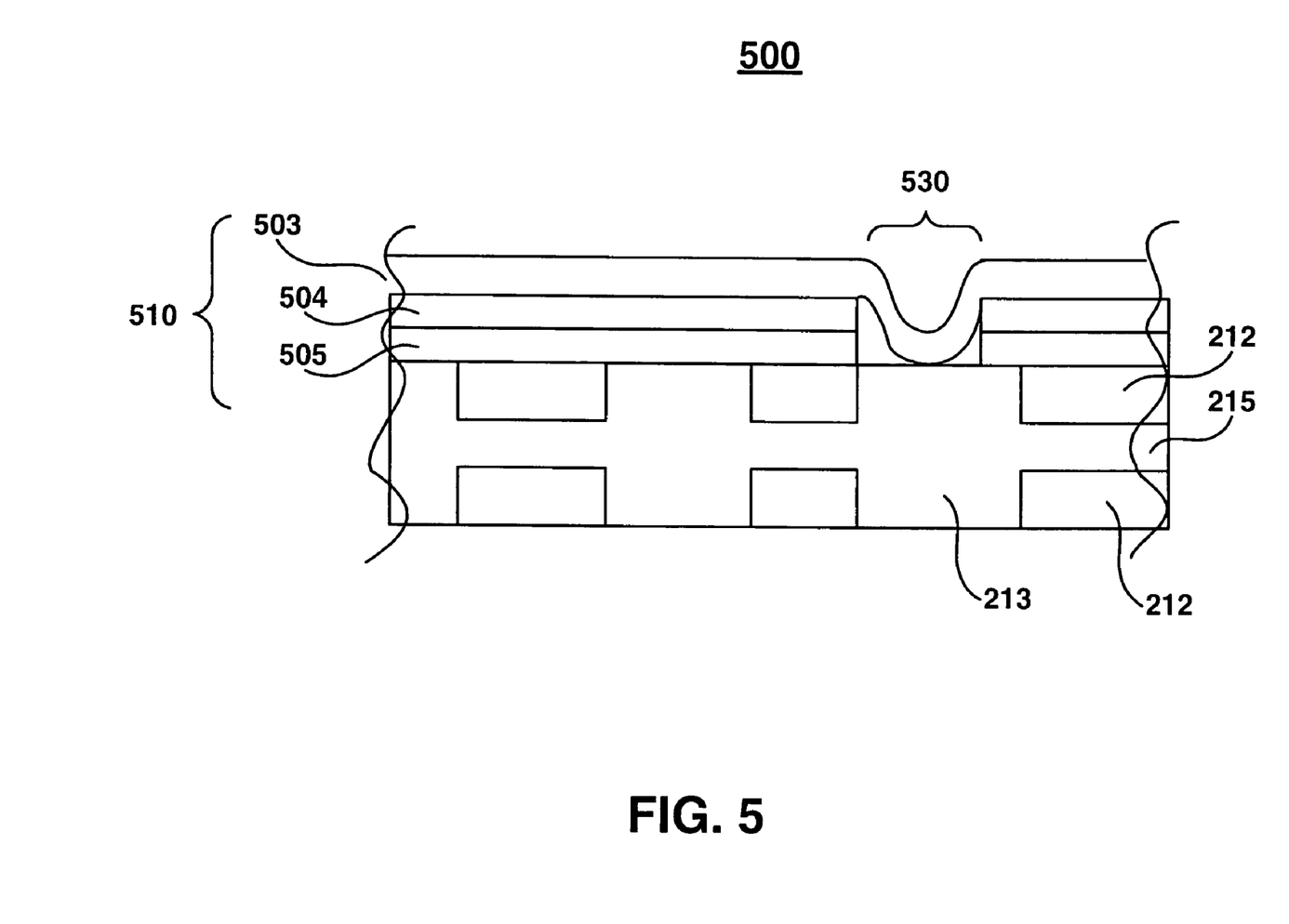
FIG. 5 is a side view of an exemplary actuator with the flexure forming a soft metal ground with the interlocking dissimilar metal component in accordance with one embodiment of the present invention.

With reference now to FIG. 5, one embodiment of the present invention shows a side view of an exemplary portion of an actuator 500 with the flexure 510 forming a soft metal ground 530 with the interlocking dissimilar metal component 200 (or optionally 275) in accordance with one embodiment of the present invention. In other words, the portion of the interlocking dissimilar metal component 200 shown may be an arm 125, a mount plate 124, a load beam 128 or the entire single piece ELS 400. Additionally, the flexure (e.g., stainless steel 505, polyimid layer 504, and copper layer 503) is shown above the portion of the interlocking dissimilar metal component 200.

In one embodiment, the polyimid layer 504 and stainless steel layer 505 of the flexure 510 are etched away above a portion of the aluminum (or soft metal) 215 or the stainless (or hard metal) 212 of the interlocking dissimilar metal component 200. In so doing, the copper layer 503 can then be grounded 530 to either the soft layer 215 or the hard steel layer 212 depending on the manufacturing preference. Additionally, because the grounding 530 can occur at one or more locations depending on which component (or components), e.g., is an arm 125, a mount plate 124, a load beam 128 or the entire single piece ELS 400, is formed from the interlocking dissimilar metal component 200. Significant electrical noise reduction can be obtained for the flexure 510.

Figure 6:
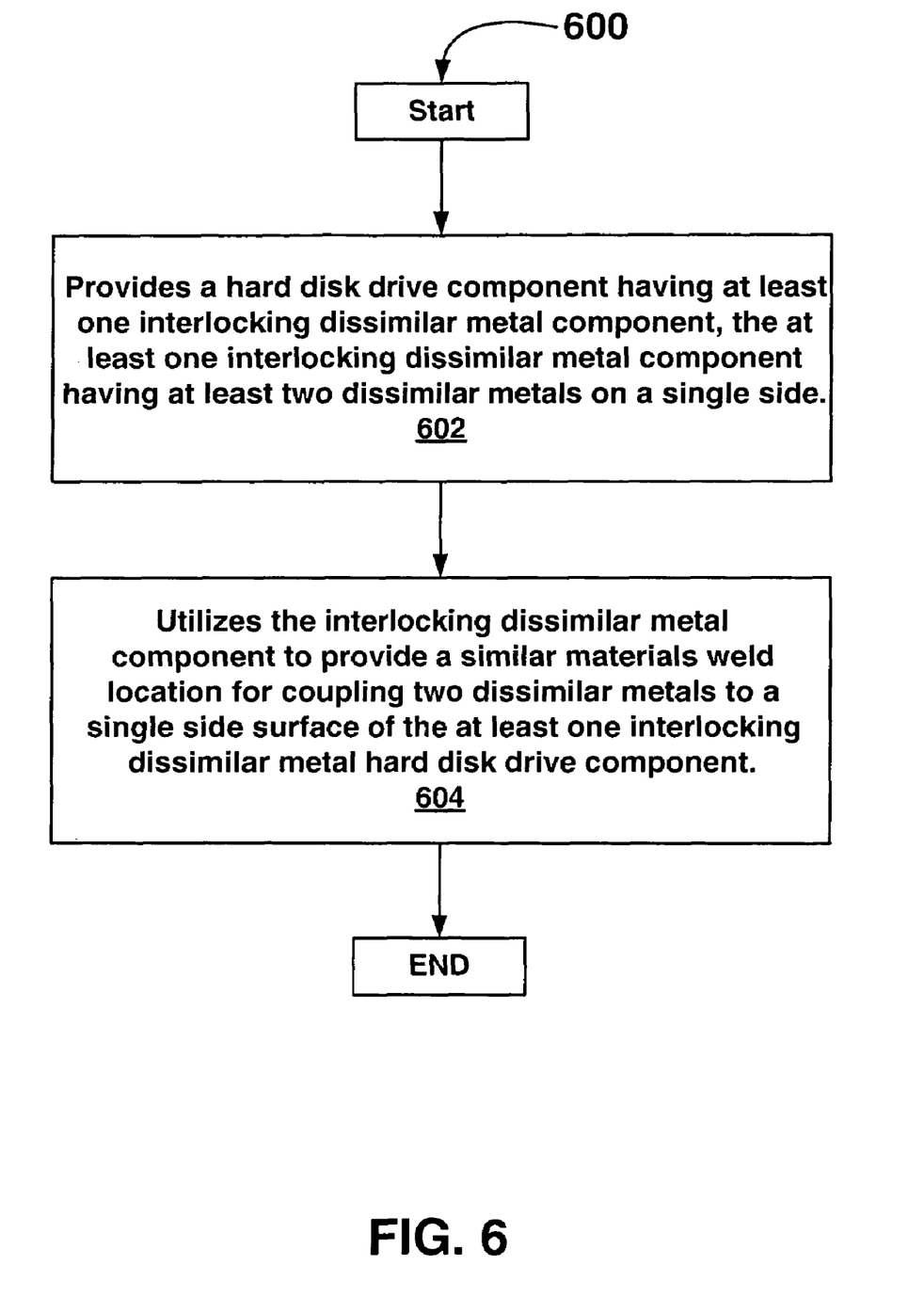
FIG. 6 is a flowchart of a method for utilizing an interlocking dissimilar metal component in the formation of a hard disk drive in accordance with one embodiment of the present invention.

Referring now to FIG. 6 and to FIG. 3, a flowchart 600 of a method for utilizing an interlocking dissimilar metal component in the formation of a hard disk drive is shown in accordance with one embodiment. In one embodiment, the hard disk drive is a flying drive, e.g., the head 220 flies above and is not in contact with the disk 115. In another embodiment, the hard disk drive is a load/unload drive. In yet another embodiment, the hard disk drive is a contact drive, e.g., the head 220 is in contact with the disk 115.

With reference now to step 602 of FIG. 6 and to FIG. 3, one embodiment provides a hard disk drive component having at least one interlocking dissimilar metal component, the at least one interlocking dissimilar metal component having at least two dissimilar metals on a single side. As described herein, the interlocking dissimilar metal component 200 may be an arm 125, a mount plate 124, a load beam 128 or the entire single piece ELS 400. In addition, the interlocking dissimilar metal component is also capable of being a part of the hard disk drive case.

As described herein and shown in FIGS. 2A-2C, in one embodiment, the interlocking dissimilar metal component 200 includes a layer of stainless steel 212 having holes 213 therein. In one embodiment, the holes are punched, etched, or the like in the stainless steel layer 212. The interlocking dissimilar metal component 200 also includes an aluminum layer 215. In another embodiment, the layer 215 is not aluminum but is another metal layer that is formed of a metal that is softer and dissimilar than stainless steel. In one embodiment, to form the interlocking dissimilar metal component 200, the layers of stainless steel 212 and aluminum 215 are rolled or compressed together. The pressure from the compression will cause the aluminum layer 125 to fill the holes in the stainless steel layer 212. In so doing, the resulting interlocking dissimilar metal component 200 will have one surface formed with two dissimilar metals located thereon.

Referring now to step 604 of FIG. 6 and to FIG. 3, one embodiment utilizes the interlocking dissimilar metal component to provide a similar materials weld location for coupling two dissimilar metals to a single side surface of the at least one interlocking dissimilar metal hard disk drive component. As described herein, in one embodiment the weld is a laser weld. In one embodiment, the components that are formed from the interlocking dissimilar metal components can include a mount plate portion of a head gimbal assembly, an arm portion of a head gimbal assembly, a load beam portion of the head gimbal assembly, or an entire ELS. Additionally, the dissimilar metal component could be used to form a cover portion for the hard disk drive.

Thus, embodiments of the present invention provide a method and system for utilizing an interlocking dissimilar metal component in the formation of a hard disk drive. Additionally, embodiments provide a method and system for utilizing an interlocking dissimilar metal component in the formation of a hard disk drive that significantly reduce actuator arm assembly gram loading discrepancies, static attitude change and dynamic flutter. Moreover, embodiments provide a method and system for utilizing an interlocking dissimilar metal component in the formation of a hard disk drive that is compatible with present manufacturing techniques resulting in little or no additional costs. Additionally, a cost reduction is also realizable due to a reduction in the number of required components used in the hard disk drive manufacture.

While the method of the embodiment illustrated in flowchart 600 shows specific sequences and quantity of steps, the present invention is suitable to alternative embodiments. For example, not all the steps provided for in the methods are required for the present invention. Furthermore, additional steps can be added to the steps presented in the present embodiment. Likewise, the sequences of steps can be modified depending upon the application.

The alternative embodiment(s) of the present invention are thus described. While the present invention has been described in particular embodiments, it should be appreciated that the present invention should not be construed as limited by such embodiments, but rather construed according to the below claims.

What is claimed is:

1. A hard disk drive comprising:
   a housing;
   at least one disk mounted to the housing;
   an actuator mounted to the housing and being movable relative to the at least one disk, the actuator having a suspension for reaching over the disk, the suspension having a head gimbal assembly thereon, said hard disk drive providing a method for utilizing an interlocking dissimilar metal component comprising aluminum and stainless steel in the formation of a hard disk drive comprising:
   providing a hard disk drive component having at least one interlocking dissimilar metal component comprising aluminum and stainless steel, said at least one interlocking dissimilar metal component having at least a portion of said aluminum and said stainless steel on a single side, said interlocking dissimilar metal component comprising:
      a first layer of said stainless steel having holes therein; and
      a first layer of said aluminum, wherein said aluminum is compressed with said stainless steel and portions of said first layer of aluminum fill the holes in said stainless steel to form said interlocking dissimilar metal component; and
   utilizing said interlocking dissimilar metal component to provide a similar materials weld location for coupling two dissimilar metals to a single side surface of said at least one interlocking dissimilar metal hard disk drive component.

2. The hard disk drive of claim 1 wherein said interlocking dissimilar metal component comprises:
   providing a first layer of said stainless steel having holes therein;
   proving a first layer of said aluminum; and
   providing a second layer of said stainless steel having holes therein, wherein said aluminum is compressed between said first layer of said stainless steel and said second layer of said stainless steel and portions of said first layer of aluminum fill the holes in said first and second layers of said stainless steel to form said interlocking dissimilar metal component having reduced distortion characteristics.

3. The hard disk drive of claim 1 wherein said dissimilar metal component is selected for use from the group of said head gimbal assembly components including: a mount plate portion of said head gimbal assembly, an arm portion of said head gimbal assembly, and a load beam portion of said head gimbal assembly.

4. The hard disk drive of claim 1 further comprising:
   utilizing said dissimilar metal component as a cover portion of said hard disk drive.

5. The hard disk drive of claim 1 further comprising:
   utilizing a laser weld to provide said similar materials weld for said single side surface of said hard disk drive component.

6. An interlocking dissimilar metal hard disk drive component comprising:
   a first layer of stainless steel having holes therein; and
   a first layer of aluminum, wherein said aluminum is compressed with said stainless steel and portions of said first layer of aluminum fill the holes in said stainless steel to form said interlocking dissimilar metal component, wherein said interlocking dissimilar metal component has at least two dissimilar metals on a single side for coupling at least two dissimilar metal hard disk drive components to a single side of said interlocking dissimilar metal component.

7. The interlocking dissimilar metal hard disk drive component of claim 6 wherein said interlocking dissimilar metal component further comprises:
- an integrated laminate suspension (ILS) flexure above said interlocking dissimilar metal component, said ILS flexure comprising a copper layer, a polyimid layer and a stainless steel layer,
- wherein said polyimid layer and said stainless steel layer of said ILS flexure are etched above a portion of said aluminum in said interlocking dissimilar metal component to provide a ground between said copper layer of said ILS and said aluminum layer of said interlocking dissimilar metal component.

8. The interlocking dissimilar metal hard disk drive component of claim 6 wherein said interlocking dissimilar metal component comprises:
- a second layer of said stainless steel having holes therein, wherein said aluminum is compressed between said first layer of said stainless steel and said second layer of said stainless steel and portions of said first layer of aluminum fill the holes in said first and second layers of said stainless steel to form said interlocking dissimilar metal component having reduced distortion characteristics.

9. The interlocking dissimilar metal hard disk drive component of claim 8 wherein during formation of a suspension load beam, said first layer of said aluminum and said second layer of said stainless steel is etched at one end to form a hinge and said first layer of said stainless steel and said first layer of said aluminum is etched at the other end to form a load/unload tab.

10. The interlocking dissimilar metal hard disk drive component of claim 6 wherein said dissimilar metal component is selected for use from the group of said head gimbal assembly components including: a mount plate portion of said head gimbal assembly, and an arm portion of said head gimbal assembly.

11. The interlocking dissimilar metal hard disk drive component of claim 6 wherein said dissimilar metal component is a cover portion of said hard disk drive.

12. The interlocking dissimilar metal hard disk drive component of claim 6 wherein a laser weld is utilized to provide said similar materials weld for said single side surface of said hard disk drive component.

13. An interlocking dissimilar metal hard disk drive component comprising:
- a means for providing a first layer of said stainless steel having holes therein; and
- a means for providing a first layer of said aluminum, wherein said aluminum is compressed with said stainless steel and portions of said first layer of aluminum fill the holes in said stainless steel to form said interlocking dissimilar metal component, wherein said interlocking dissimilar metal component has at least two dissimilar metals on a single side for coupling at least two dissimilar metal hard disk drive components to a single side of said interlocking dissimilar metal component.

* * * * *